United States Patent [19]

Naito et al.

[11] Patent Number: 5,052,051

[45] Date of Patent: Sep. 24, 1991

[54] HETERODYNE RECEIVER FOR COHERENT OPTICAL COMMUNICATION

[75] Inventors: Takao Naito, Kawasaki; Terumi Chikama, Machida; Shigeki Watanabe, Kawasaki; Tetsuya Kiyonaga, Kawasaki; Yoshihito Onoda, Kawasaki, all of Japan

[73] Assignee: Fujitsu Limited, Kawasaki, Japan

[21] Appl. No.: 424,732

[22] Filed: Oct. 20, 1989

[30] Foreign Application Priority Data

Oct. 20, 1988 [JP] Japan ............................... 63-262943

[51] Int. Cl.⁵ ........................................... H04B 10/06
[52] U.S. Cl. .................................................. 455/619
[58] Field of Search ..................... 455/616, 619; 370/2

[56] References Cited

U.S. PATENT DOCUMENTS 4,856,093 8/1989 Mohr .................................. 455/619

FOREIGN PATENT DOCUMENTS 0310174 4/1989 European Pat. Off. ............ 455/616

OTHER PUBLICATIONS

Imai et al., "Optical Polarization Control Utilising an Optical Heterodyne Detection Scheme", Electronic Letters, 1-21-85, vol. 21, #2, pp. 52-53.
Kidoh, "Polarization Control on Output of Single Mode Fiber", IEEE Journal on Quantum Electronics, vol. QE17 #6, 6-81.
Naito et al., "Wideband Optical Image Rejection Receiver and Its Crosstalk Penalty", Electronics Letters, Jul. 6, 1989, vol. 25, No. 14, pp. 895–896.

Primary Examiner—Reinhard J. Eisenzopf
Assistant Examiner—L. Pascal
Attorney, Agent, or Firm—Staas & Halsey

[57] ABSTRACT

After mixing the signal light and the local oscillation light with a mixing circuit, two intersecting polarization components are divided by a polarization splitter and respective components are subjected to heterodyne detection by optical receivers. Thereafter, in an electric signal stage, the intermediate frequency signal outputted from the optical receivers are applied to a 90-degree hybrid coupler and the output signal from one of the output ports is demodulated by a demodulator. On the other hand, an intermediate frequency signal outputted from the optical receivers are subjected to a subtraction to provide a principal axis angle monitor signal for the signal light. The signal outputted from the output port from the 90-degree hybrid coupler is used to monitor the elliptic ratio of the signal light and these monitor signals are applied to the polarization control circuit. The polarization control circuit drives the polarization operation apparatus based on said monitor signal to control the polarization state (i.e. a principal axis angle and the elliptic ratio) of the signal light to achieve the optimum state.

33 Claims, 7 Drawing Sheets

HETERODYNE RECEIVER FOR COHERENT OPTICAL COMMUNICATION

BACKGROUND OF THE INVENTION

The present invention relates to an optical transmitting and receiving apparatus of a heterodyne detecting system applicable to a coherent optical transmission which is expected to be applied to a long-distance large capacity communication, and more particularly to an improvement of a circuit portion for positively controlling the polarization state of a signal light.

In coherent optical communication, a heterodyne detecting system is used to detect a signal light received through a light transmission path, and to also detect a local oscillation light. However, in such a system, the polarization state of a signal varies during its period of transmission along an optical fiber. Thus, when a signal light is mixed with a local oscillation light, there is the problem that the detecting efficiency is deteriorated. To solve this problem, a method is required for positively controlling the polarization states of a signal light and a local oscillation light. FIG. 1 shows a circuit structure of a prior art heterodyne detecting receiving apparatus used to achieve this positive control.

In the drawing, the signal light transmitted through an optical fiber is inputted to mixing circuit 2 through polarization apparatus 1 and is then mixed with local oscillation light outputted from optical local oscillating circuit 3. The local oscillating light is assumed to be in a polarized state in which the principal axis angle is slanted, for example, by 45 degrees and the elliptic ratio is 1. One output signal from mixing circuit 2 is subjected to heterodyne detection by optical receiver 4 and is converted to an intermediate frequency signal. This intermediate frequency signal is demodulated by demodulator 5 and outputted therefrom.

The other output signal from mixing circuit 2 is used to monitor the polarization state of the signal light. Namely, the optical signal for monitoring is first divided into two portions by half mirror 6 and the transparent light is separated by polarization splitter 7 into two polarization components which intersect at right angles. The optical signal is thereafter converted into an electrical signal by optical receivers 8 and 9. The light reflected from half mirror 6 is subjected to a conversion of its polarization state by λ/4 plate 10 (for example, a linearly polarized light is converted to a circularly polarized light or a circularly polarized light is converted into a linearly polarized light) and subsequently the reflected light is separated into two orthogonal polarization components by polarization splitter 11, whose axis is rotated 45 degrees from that of polarization splitter 7 and is thereafter converted into an electrical signal by optical receivers 12 and 13. The output signals from optical receivers 8 and 9 are inputted to differential amplifier 14 and the output signals from optical receivers 12 and 13 are inputted to the other differential amplifier 15. Differential amplifier signals A and B obtained from differential amplifiers 14 and 15 are used as monitor signals by polarization operation apparatus 1 to control the polarization state of the signal light. For example, the principal axis angle of the polarization state of the signal light is controlled by making signal A equal to 0 and the elliptic ratio is controlled by making signal B equal to 0.

In the prior art heterodyne detecting receiver described above, a part of the signal light is divided into two portions by half mirror 6 and polarization splitters 7 and 11, and the polarization state of the signal light is monitored by four optical receivers 8, 9, 12 and 13, thus controlling the polarization state of the signal light.

Accordingly, the structure of the optical system becomes complicated as half mirror 6, λ/4 plate 10, the two polarization splitters 7 and 11, and the four optical receivers 8, 9, 12 and 13 must be used for merely monitoring the polarization state of signal light, even when optuical receivers are required, resulting in the problem that the apparatus must be large. A part of the signal light is divided and used only for monitoring. Thus, the receiving sensitivity is deteriorated by an amount corresponding to the use of such a monitoring system. Further, there is a problem that the prior art apparatus cannot form a DBOR (Dual Balanced Optical Signal Receiver, refer to Japanese Patent Kokai Nos. 63-19928 and 63-1124, U.S. application Ser. No. 064058/87, EPC Application No. 87108787, Canadian Application No. 539613/87) which makes it possible to perform a high-sensitivity receiving operation by using the signal component effectively supressing the noise component.

Summary of the Invention

An object of the present invention is to provide a simply structured optical system for monitoring the polarization state of a signal light and for receiving the light with high sensitivity.

A feature of the present invention is to provide a heterodyne receiver for coherent optical communication comprising an optical local oscillating circuit for producing a local oscillation light, a polarization operating apparatus for varying the polarization state of a signal light transmitted through a light transmission path, a mixing circuit for mixing a signal light having its polarization state corrected by said polarization operating apparatus with a local oscillation light outputted from said optical local oscillating circuit, a polarization splitter for separating an output light from said mixing circuit into two kinds of polarization component, optical receivers for detecting signals for every polarization component obtained from said polarization splitter to provide an intermediate frequency signal, a 90-degree hybrid coupler for receiving two intermediate frequency signals outputted from said optical receivers, a demodulator for demodulating an intermediate frequency signal outputted from said 90-degree hybrid coupler, and a polarization control circuit for controlling the polarization state of said signal output, by driving said polarization operating apparatus based on respective output signals from said optical receivers and said 90-degree hybrid coupler.

DESCRIPTION OF THE PREFERRED EMBODIMENT

Figure 1:
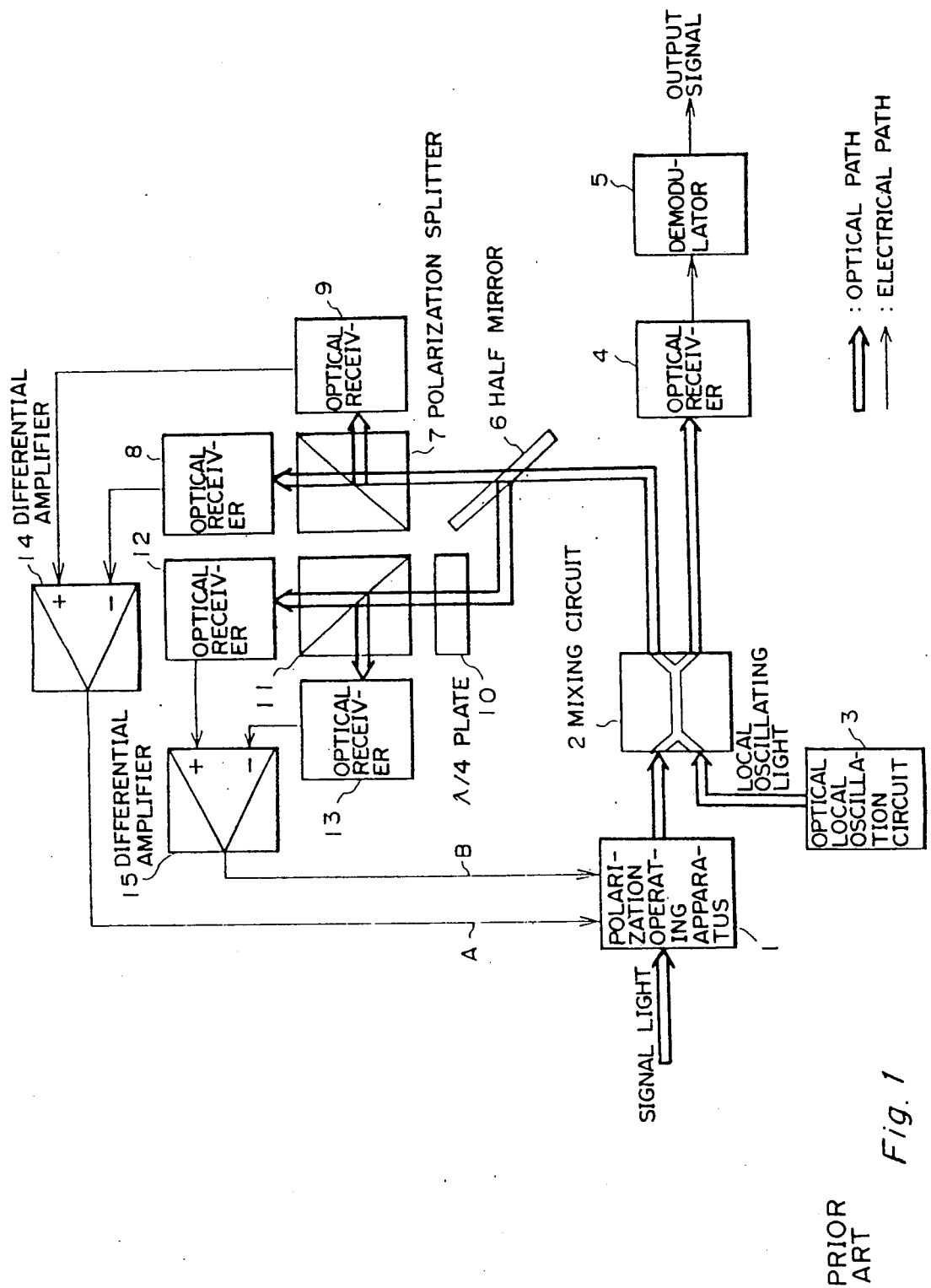
FIG. 1 is a block diagram showing the heterodyne receiving apparatus of the prior art.
Figure 2:
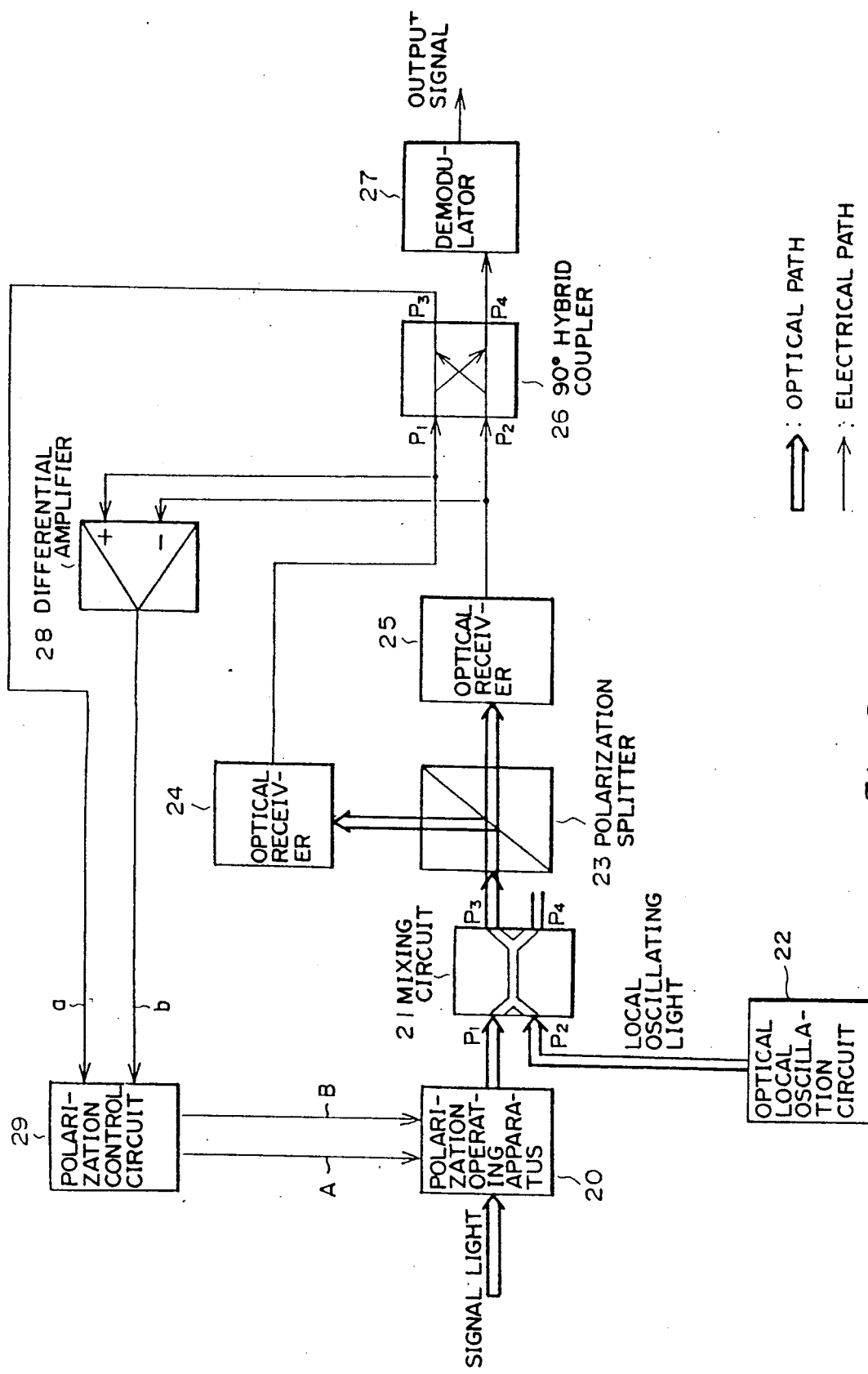
FIG. 2 is a principle block diagram of the present invention.

FIG. 2 shows a principle block diagram of the present invention.

In the drawing, a signal light transmitted through a light transmission path is provided to mixing circuit 21 through polarization operating apparatus 20 and a local oscillation light from optical local oscillation circuit 22 is inputted to mixing circuit 21 in which a signal light is mixed with a local oscillation light. The polarization state of the local oscillation light is made to have its principle axis angle slanted by, for example, 45 degrees. After the signal is mixed with the local oscillation light by mixing circuit 21, the mixed light is separated by polarization aplitter 23 into two orthogonal polarization components to each other. The components are subjected to respective heterodyne detections in optical receivers 24 and 25 to provide an intermediate frequency signal. The structure explained up to this point comprises an optical system. The structure explained next comprises an electrical signal stage.

In the electrical signal stage, intermediate frequency signals outputted from optical receivers 24 and 25 are provided to 90-degree hybrid coupler 26 and the output signal from output port P4 is demodulated by demodulator 27 to form an output. On the other hand, intermediate frequency signals outputted from optical receivers 24 and 25 are inputted to a subtracting circuit, for example, to differential amplifier 28; the output signal b from differential amplifier 28 is provided to polarization control circuit 29; and the other output port P3 of 90-degree hybrid coupler 26 is added to polarization control circuit 29. Polarization control circuit 29 produces control signals A and B based on the above signals a and b to drive a polarization operating apparatus 20 and control the polarization state (i.e. principal axis angle and elliptic ratio) of the signal light.

In FIG. 2, two orthogonal polarization components (for example, comprising a polarization component at 0-degrees and a polarization component at 90-degrees) are separated by polarization splitter 23 and detected by respective optical receivers 24 and 25 to be subject to a heterodyne detection. Therefore, the power of two intermediate frequency signals obtained by the heterodyne detection are compared to detect how far the output signal b from differential amplifier 28 is shifted from 0. This enables the degree of the shift of the principal axis of the polarization state of the signal light from the 45-degree angle to be detected. Therefore, by driving polarization operating apparatus 20 by polarization control circuit 29 so that signal b becomes 0, the principal axis of the polarization state of the signal light is maintained at an angle of 45 degrees.

These two intermediate frequency signals inputted to 90-degree hybrid coupler 26 deviate in phase from each other by 90 degrees. The phase is further shifted by 90-degree hybrid coupler 26 by 90 degrees. Then the signals of the same phase are added to one output port p4 and the signals of opposite phase are added to the other output port p3 (to cancel the signals of the opposite phases). By detecting how far from zero the signal a outputted from the output port p3 is shifted, the elliptic ratio of the signal light can be detected. Therefore, by driving polarization operating apparatus 20 by polarization control circuit 29 so that the above signal a becomes 0, the polarization state of the signal light can be determined such that it has a phase difference of 90 degrees with respect to the polarization state of the local oscillation light. For example, when the polarization state of the local oscillation light is in 45-degree linear polarization, the polarization state of the signal light can be controlled in circular polarization.

Further the emphasized beat component can be obtained from port p4 of 90-degree hybrid coupler 26, and the image component can be outputted from the other port p3 to be canceled. By driving polarization operating apparatus 20 by polarization control circuit 29 so that signal a becomes 0, the image component can be deleted from the intermediate frequency signal outputted from port p4.

According to the present invention at least two optical receiving apparatuses may be sufficient, thus making the optical system simpler than that of the prior art, and enabling a reduction in size of the apparatus as a whole. It is not necessary to divide the signal light only for the purpose of monitoring its polarization state. This can be monitored via the electric signal stage, thereby enabling the light to be received with a higher sensitivity than in the prior art. Further, it is possible to construct the present invention using a DBOR and in this case, a still higher sensitivity reception is possible.

An embodiment of the present invention will be explained by referring to the drawings.

Figure 3:
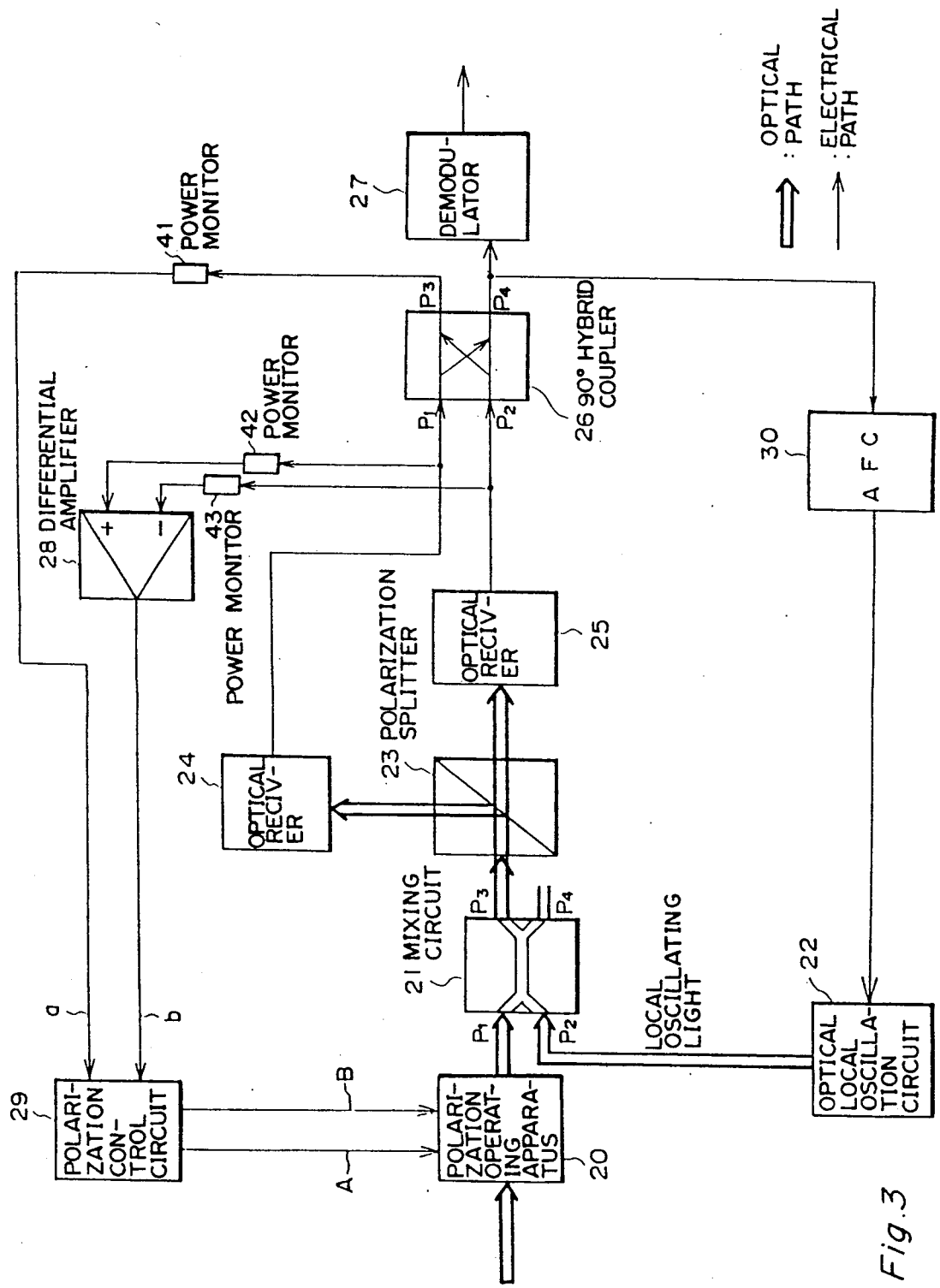
FIG. 3 is a block diagram of a first embodiment of the present invention.

FIG. 3 shows a block diagram of a first embodiment of the present invention. The optical system comprises polarization operating apparatus 20, mixing circuit 21 comprising a photo coupler, light local oscillating circuit 22 comprising a semiconductor lazer, polarization splitter 23, and two optical receivers 24 and 25 comprising photo transistors. The electrical signal stage comprises 90-degree hybrid coupler 26, demodulator 27, differential amplifier 28, polarization control circuit 29 and AFC (automatic frequency controller) 30 and power monitors 41, 42, 43 comprising diodes and so on.

Figure 4:
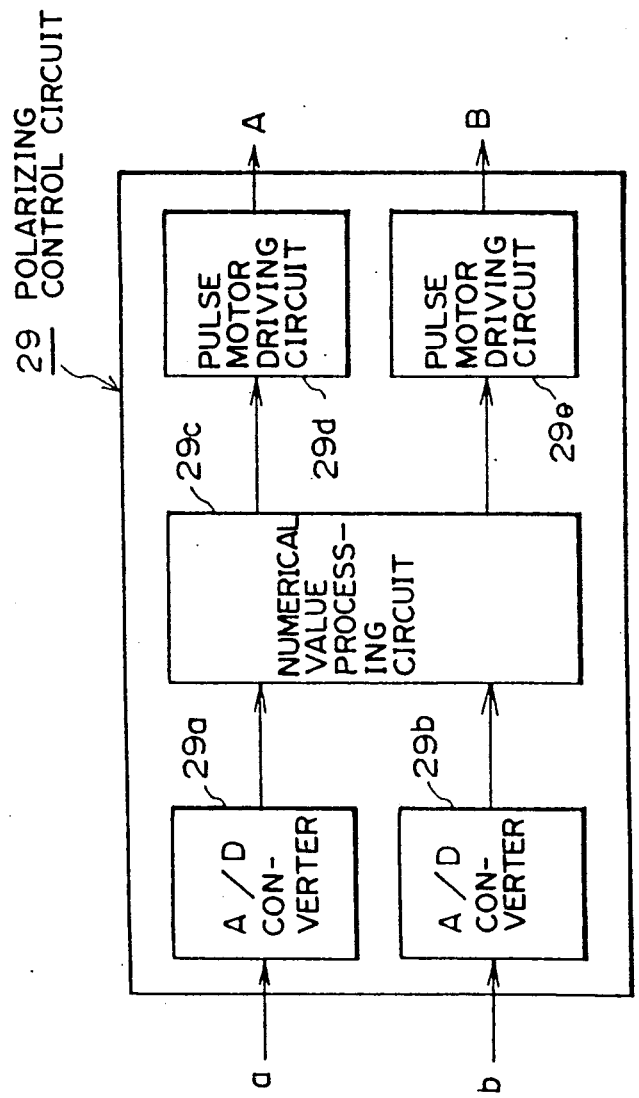
FIG. 4 is a block diagram of an example of a structure of a polarization control circuit 29 shown in FIG. 3.

An example of a detailed structure of polarization control circuit 29 and polarization operating apparatus 20 are shown in FIGS. 3 and 4. Polarization control circuit 29, shown in FIGS. 3 and 4, comprises A/D converters 29a and 29b and is for converting input analog signals a and b to digital signals. Numerical value processing circuit 29c is for performing numerical processing based on the digital signal, and pulse motor driving circuits 29d and 29e are for outputting control signals A and B for driving pulse motors 20c and 20d (which should be referred to in FIG. 5), based on the result of the above numerical value processing.

Figure 6:
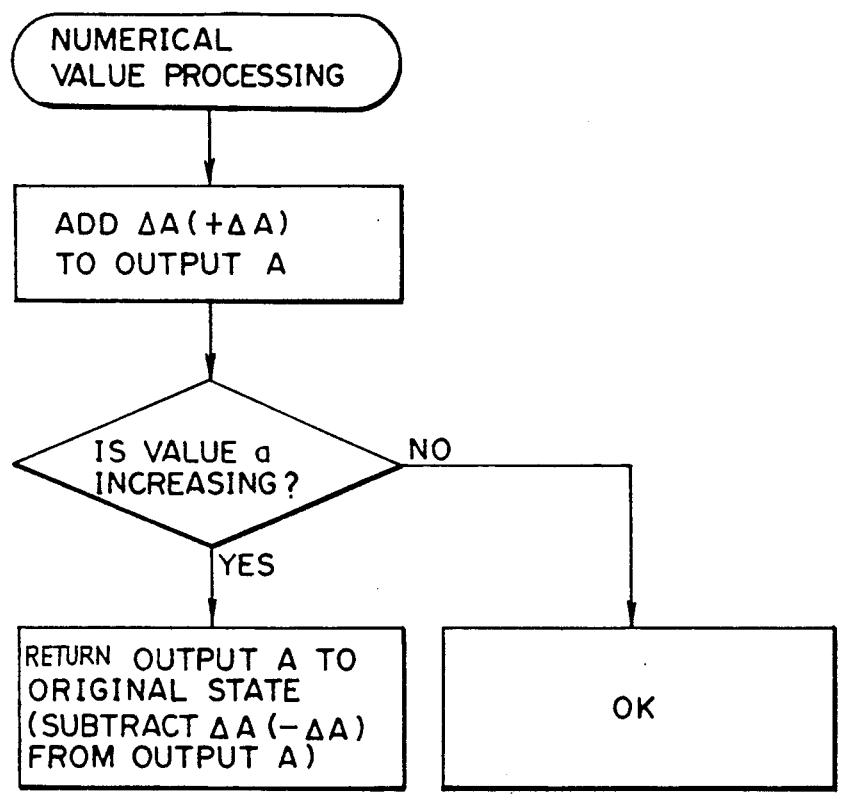
FIG. 6 shows an example of processing by numerical value processing circuit 29c, shown in FIG. 4

The above numerical process is conducted by using a so called mountain climbing algorithm to control the outputs A and B from pulse motor driving circuit 29d and 29e so that the input signals a and b are made 0 or a minimum value. More concretely, as shown in FIG. 6, the output A is increased by a small value $\Delta A$. If signal a increases, the output A is decreased by $\Delta A$ to return the output A to the original value. On the other hand, if signal a does not increase, the case is considered as correct (OK). By repeating this process, output A is set when signal a becomes 0 (or a minimum value). Actually such a process can be simultaneously conducted with output B and signal b. Outputs A and B are set to the optimum when, the signals a and b become 0 or a minimum value simultaneously. Analog signals a and b need not be subjected to A/D conversion, but may be subjected to numerical processing at numerical value processing circuit 29c.

Figure 5:
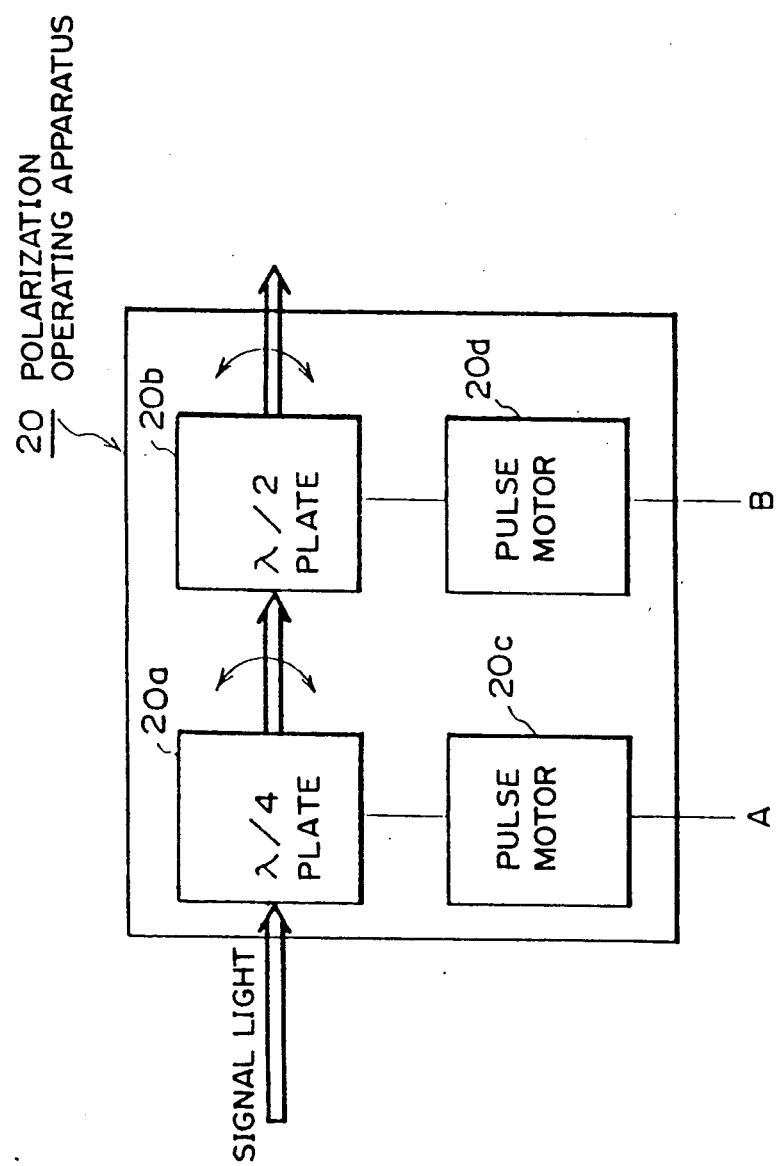
FIG. 5 is a block diagram of an example of a structure of a polarization operating apparatus 20 shown in FIG. 3.

On the other hand, as shown in FIG. 5, polarization operation apparatus 20 comprises λ/4 plate 20a and λ/2 plate 20b disposed in series around the optical path of the signal light and pulse motor 20c and 20d for performing rotation control in accordance with signals A and B. When the rotation angle of λ/4 plate 20a is changed by pulse motor 20c, the elliptic ratio of the signal light can be changed. Where the rotation angle of λ/2 plate 20d is changed by pulse motor 20d, the principal axis angle of the signal light can be changed.

In the embodiment of the heterodyne receiving apparatus of the above structure shown in FIGS. 3 and 4, the signal light transmitted along the optical fiber is inputted to one of the input ports p1 of mixing circuit 21 through polarization operating apparatus 20. Optical local oscillating circuit 22 produces an optical oscillating light which is inputted to the other port p2 of mixing circuit 21. The signal light and local oscillating light are mixed in mixing circuit 21, thereby producing a light signal having the beat component from output port p3. The light signal is divided by polarization splitter 23 into two polarization components, in the X and Y directions, which are interposed with each other. The light signal is thereafter subjected to heterodyne detection by optical receiving apparatuses 24 and 25.

The operation of the optical system will be explained in detail by referring to a mathematical equation.

The local oscillation light is formed in a polarization state having a principal axis at a 45-degree slant (for example, in the state of circular polarization, or 45-degree or 135-degree linear polarization), and the light powers of the polarizabtion components in the X and Y directions are made equal by polarization splitter 23. The polarization state of the local oscillation light is expressed in the following equations.

$$X = 1/\sqrt{2} \times \sqrt{P_{LO}} \times \cos(\omega_{LO}t)$$

$$Y = 1/\sqrt{2} \times \sqrt{P_{LO}} \times \cos(\omega_{LO} + \theta_{L0})$$

For example, where $\theta_{LO}=0$ or $\pi/2$, they designate, respectively, 45-degree linear polarization light or circular polarization light.

On the other hand, the signal light has a principal angle of 45 degrees and a phase difference of 90 degrees from the polarization state of the local oscillation light. For example, where the polarization state of the local oscillation light designates circular polarization light, the polarization state of the signal light is made to show 45-degree or 135-degree linear polarization. On the other hand, where the polarization state of the local oscillation light is made to achieve 45-degree or 135-degree linear polarization light, then the polarization state of the signal light is made to represent circular polarization light. The polarization state of the signal light is expressed by, $$X = 1/\sqrt{2} \times \sqrt{P_S} \times \cos(\omega_S t)$$

$$Y = 1/\sqrt{2} \times \sqrt{P_S} \times \cos(\omega_S t + \theta_S)$$

where the relation of $\theta_S - \theta_{LO} = \pi/2$ is satisfied. As expressed by the above equation the local oscillation lights are mixed in mixing circuit 21 and thereafter the signal light is divided by polarization splitter 23 into two orthogonal polarization components and is subjected to a heterodyne detection by optical receivers 24 and 25. Therefore, the intermediate frequency signals $I_X$ and $I_Y$ which are shifted from each other by 90 degrees in phase can be obtained from $$I_X = I_0 \cos((\omega_S - \omega_{LO})t)$$
$$I_Y = I_0 \cos((\omega_S - \omega_{LO})t) + (\theta_S - \theta_{LO}))$$
$$= I_0 \sin((\omega_S - \omega_{LO})t)$$

$$\text{where, } I_0 = \tfrac{1}{2} \times \sqrt{P_{LO} P_S}$$

The process in the electrical signal stage will be explained in detail hereinafter.

Two intermediate frequency signals $I_X$ and $I_Y$ are respectively inputted to input ports P1 and P2 of 90-degree hybrid coupler 26 and have their phases delayed by 90 degrees, and the outputs corresponding to the intermediate frequency signals are outputted from output ports P3 and P4 of 90-degree hybrid coupler 26. Thus, the phase does not change along the path from port P1 to port P3 and the path from port P2 to port P4, but is delayed by 90 degrees along the path from port P1 to port P4 and the path from port P2 to port P3. The outputs $O_X$ and $O_Y$ from 90-degree hybrid coupler 26 are expressed by $$O_X = I_X + [I_Y]$$
$$= (-1 + sgn(\omega_S - \omega_{LO})) \times I_X$$
$$O_Y = [I_X] + I_Y$$
$$= (1 + sgn(\omega_S - \omega_{LO})) \times I_Y$$

where [ ] means the phase delay by 90 degrees. It is also defined that $$sgn(\omega_S - \omega_{LO}) = \begin{cases} 1 \ (\omega_S - \omega_{LO} > 0) \\ -1 \ (\omega_S - \omega_{LO} < 0) \end{cases}$$

As is clear from the equations $O_X$ and $O_Y$, where $\omega_S - \omega_{LO} > 0$, $O_X = 0$ and $O_Y = 2I_Y$ and where $\omega_S - \omega_{LO} < 0$, $O_Y = 0$ and $O_X = -2I_X$, two intermediate frequency signals $I_X$ and $I_Y$, which are inputted to 90-degree hybrid coupler 26 are shifted from each other by 90 degrees in phase. Therefore, when the two intermediate frequency signals are further shifted by 90 degrees in phase by 90-degree hybrid coupler 26, signals with the same phase are added to each other and outputted from one of the output ports, and the signals of the opposite phase are applied to the other output port to be canceled by each other in accordance with the magnitude relation between $\omega_S$ and $\omega_{LO}$. In the present embodiment, it is supposed that $\omega_S - \omega_{LO} > 0$ is satisfied and in accordance with this condition, output $O_Y$ (=$2I_Y$) from port P4 is demodulated by demodulator 27 and then outputted from it. To make the above output $O_Y$ stable at a predetermined frequency, the osillation frequency of optical local oscillator circuit 22 is adequately controlled by AFC30.

The monitoring of the polarization state of the signal light will now be explained in more detail.

Two orthogonal polarization components comprising, for example, 0-degree polarization components and a 90-degree polarization component, which are separated by polarization aplitter 23, are subjected to heterodyne detection by optical receivers 24 and 25. Therefore, the powers of two intermediate frequency signals $I_X$ and $I_Y$ obtained by heterodyne detection are compared and it can thus be detected how far the principal axis angle in the polarization state of the signal light is shifted from 45-degrees. In the above embodiment, the envelope of the intermediate frequency signals $I_X$ and $I_Y$ are detected by power monitors 42, 43 and only the power is read out to input to differential amplifier 28 and the output thereof is applied to polarization control circuit 29 as signal b. Therefore, the amount by which signal b is shifted from 0 corresponds to the amount by which the principal axis angle in the polarization state of the signal light is shifted from 45 degrees. Therefore, by driving polarization operating apparatus 20 by polarization control circuit 29 so that signal b becomes 0, the principal axis angle in the polarization state of the signal light is maintained at 45 degrees.

By detecting how far output $O_X$ from port P3 of 90-degree hybrid coupler 26 is shifted from 0, the elliptic ratio of the signal light can be determined. In the present embodiment, the envelope of the output Ox from port P3 is detected by power monitor 41 and power is read out to provide to polarization control circuit 29 as signal a and the polarization operating apparatus is driven by polarization control circuit 29 so that signal a becomes 0, namely, $\theta_S - \theta_{LO} = \pi/2$. The polarization state of the signal light is made a circular (where the local oscillation light is in 45-degree or 135-degree linear polarization), or is made 45-degree or 135-degree (where the local oscillation light is in circular polarization).

The amplified beat components are obtained from ports P4 of 90-degree hybrid coupler 26 and the image components are outputted from port P3 to cancel each other out. Thus, the image component can be deleted from the intermediate frequency signal outputted from port P4 by driving polarization operating apparatus 20 by polarization control circuit 29 so that signal a is made 0 as described above.

As stated above, the present embodiment employs only two optical receiving apparatuses and its structure is made simpler than that of the prior art optical system, thereby realizing a miniaturization of the apparatus as a whole. The signal light is not divided merely for the purpose of monitoring the polarization state of the signal light. Furthermore, the polarization state can be monitored in the electrical signal stage, thereby making the receiving sensitivity much better than in the prior art.

Figure 7:
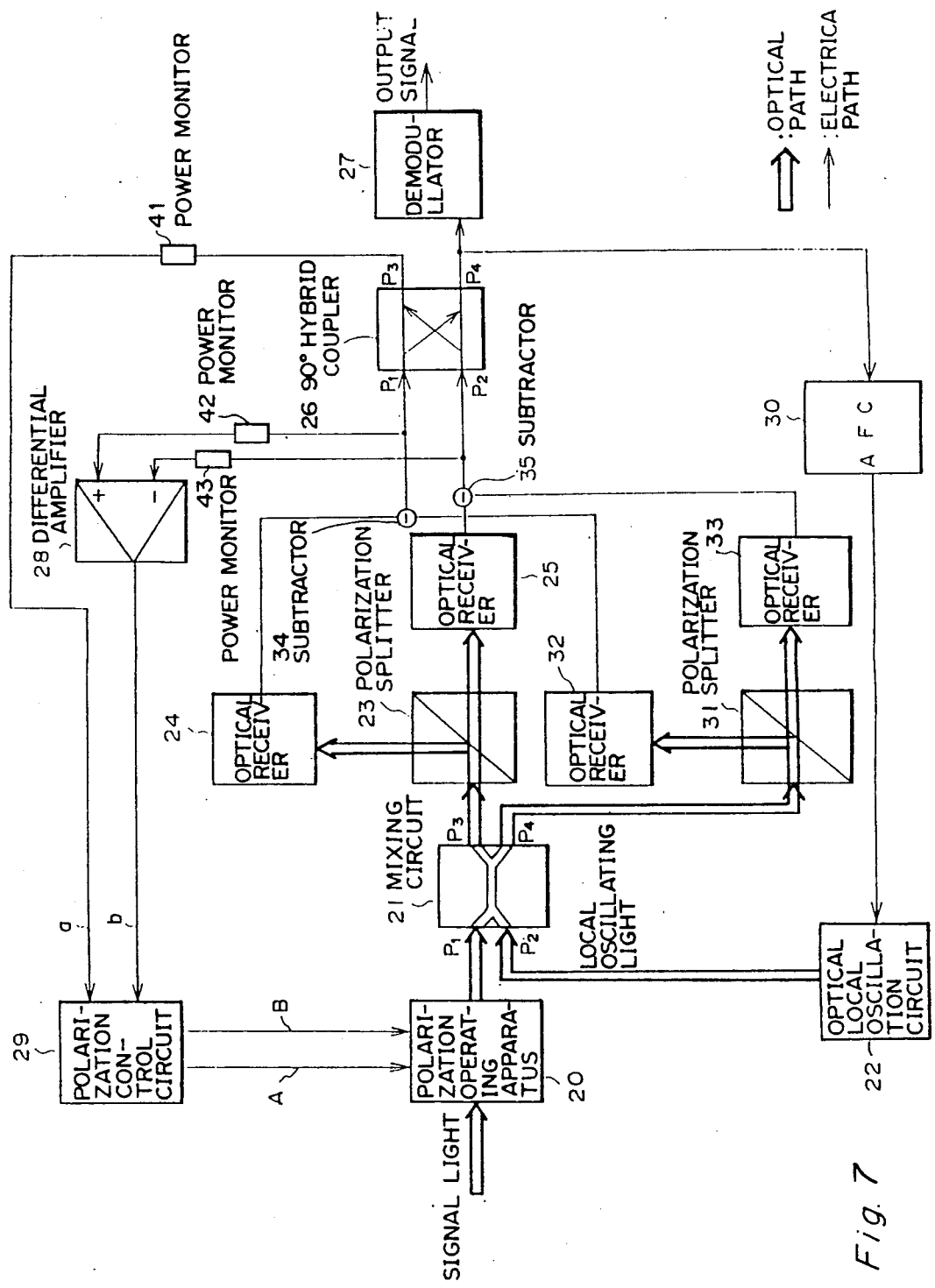
FIG. 7 is a block diagram of a second embodiment of the present invention.

FIG. 7 shows a block diagram of the second embodiment of the present invention.

This embodiment is formed of a DBOR (Dual Balanced Optical Reciver). Namely, another pair comprising polarization splitter 31 and optical receivers 32 and 33, having a structure similar to the aforementioned polarization splitter 23 and optical receivers 24 and 25, is provided to port P4 of mixing circuit 21 in the first embodiment. The output from optical receivers 24 and 32 are applied to subtractor 35.

In this construction, the signal light is mixed with the local oscillation light in mixing circuit 21, and optical signals having a phase difference of 180 degrees are outputted from ports P3 and P4.

These light signals are divided into equal parts by polarization splitters 23 and 31 and then subjected to heterodyne detection by light receivers 24, 25, 32 and 33. The intermediate frequency signal obtained by optical receivers 24 and 32 are applied to subtractor 34 and the intermediate signals obtained by optical receivers 25 and 33 are applied to subtractor 35. At this time, beat components having a 180-degree phase difference are inputted to optical receivers 24 and 32 and similarly beat components having a 180-degree phase difference are inputted to optical receivers 25 and 33. The beat components are added to be amplified and noise intensity components of the local oscillation light cancel each other in subtractors 34 and 35. The intermediate frequency signal in which the noise intensity component is suppressed is inputted to 90-degree hybrid coupler 26 and differential amplifier 28. Thereafter, the same process as in the first embodiment is continued.

Accordingly, the second embodiment effectively utilizes two output lights from mixing circuit 21, thereby suppressing the excess intensity noise of the local oscillation light and greatly increasing the receiving sensitivity.

The above embodiments describe the case where either the signal light or the local oscillation light is made to be in 45-degree (or 135-degree) linear polarization and the other is made to be in circular polarization. It is not always necessary to use the above arrangement. Namely, it is a required condition that both the signal light and local oscillation light be in a polarization state having their principal axes at 45 degrees, and that the phase difference between them be 90 degrees. Any polarization state satisfying the above condition may be used. For example, it may be possible for the signal light to have elliptic polarization with 110-degree phase difference between the X components and Y components of the signal light, and for the local oscillation light to have elliptic polarization with a phase difference of 20 degrees between the X and Y components of the local oscillation light.

Instead of performing a subtraction of the signals from power monitors 42 and 43 using differential amplifier 28, for example, the circuit for inverting the signals from the power monitor 42 and the circuit for outputting the signal b by adding the output of the inverting circuit to the output from the power monitor 43 may be employed.

Further, as polarization operating apparatus 20, instead of the structure shown in FIG. 5, a wave guide device comprising an electrical optical crystal such as lithium niobate may be employed to perform a phase modulation by applying an appropriate voltage to the electrodes provided on the wave guide device, thereby enabling the polarization state of the signal light to be changed.

According to the present invention, at least two optical receivers may be sufficient and thus, the structure of the optical system may be simplified and the apparatus as a whole may be miniaturized. The signal light is not divided merely for monitoring its polarization state and the polarization state may be monitored in the electrical signal stage. Therefore, a much higher sensitivity can be achieved upon receiving the signal light than in the prior art.

Further, as the present invention may be easily formed using a DBOR, even higher sensitivity reception is possible.

In the polarization operating apparatus by using the polarization control circuit so that the output signal (i.e. the output signal for monitoring) from the 90-degree hybrid coupler becomes 0, the image component may be deleted from the other output signal.

What is claimed is:

1. A heterodyne receiver for coherent optical communication comprising:
   an optical local oscillating circuit for producing a local oscillation light;
   a polarization operating apparatus for varying a polarization state of a signal light transmitted through a light transmission path;
   a mixing circuit responsive to said optical local oscillating circuit and said polarization operating apparatus for mixing the signal light, with the local oscillation light, said mixing circuit outputting at least one output light;
   a polarization splitter responsive to said mixing circuit for separating an output light from said mixing circuit into polarization components;
   a plurality of optical receivers responsive to said polarization splitter for detecting signals with respect to polarization components obtained by said polarization splitter to provide intermediate frequency signals;
   a 90-degree hybrid coupler responsive to said optical receivers for delaying the phase of the intermediate frequency signals by 90 degrees to produce first and second delayed signals, for adding the first delayed signal to one intermediate frequency signal to produce a first sum and for adding the second delayed signal to another intermediate frequency signal to produce a second sum;
   a demodulator responsive to said 90-degree hybrid coupler for demodulating the second sum outputted from said 90-degree hybrid coupler; and
   a polarization control circuit for controlling the polarization state of an output of said heterodyne receiver, by driving said polarization operating apparatus based on the intermediate frequency signals output from said optical receivers and the first sum output of said 90-degree hybrid coupler.

2. The heterodyne receiving apparatus according to claim 1, wherein the signal light and the local oscillation light have principal axes angles slated at 45-degrees, and a phase difference there between of 90 degrees.

3. The heterodyne receiving apparatus according to claim 1, wherein said optical local oscillation circuit includes a semiconductor laser.

4. The heterodyne receiving apparatus according to claim 1, wherein said polarization operating apparatus comprises:
   a λ/4 plate and a λ/2 plate arranged in series on the light transmission path of the signal light, and
   a pulse motor for individually rotating the λ/4 plate and the λ/2 plate.

5. The heterodyne receiving apparatus according to claim 1, wherein said polarization splitter divides the output light of said mixing circuit into two orthogonal polarization components.

6. The heterodyne receiving apparatus according to claim 1,
   wherein said plurality of optical receivers each comprises a photo-diode for performing heterodyne detection on a signal corresponding to respective polarization components obtained by said polarization, and
   wherein together the optical receivers provide at least two of said intermediate frequency signals having phases differing by 90 degrees.

7. The heterodyne receiving apparatus according to claim 1, wherein said 90-degree hybrid coupler outputs an elliptic ratio signal as the first sum.

8. The heterodyne receiving apparatus according to claim 7, wherein said 90-degree hybrid coupler outputs the elliptic ratio signal with a minimum value and removes an image component from the second sum.

9. The heterodyne receiving apparatus according to claim 1,
   wherein said apparatus further comprises a differential amplifier operatively connected to said polarization control circuit and responsive to the intermediate frequency signals from said optical receivers, said differential amplifier outputting a principal axis angle signal to said polarization control circuit for monitoring the principal axis angle of the signal light, and
   wherein the first sum output from said 90-degree hybrid coupler is provided to said polarization control circuit as an elliptic ratio signal for monitoring an elliptic ratio of the signal light.

10. The heterodyne receiving apparatus according to claim 9, wherein said polarization control circuit drives the polarization operating apparatus to minimize both the principal axis angle signal and the elliptic ratio signal.

11. The heterodyne receiving apparatus according to claim 10, wherein said polarization control circuit comprises:
   an A/D converter responsive to the principal axis angle signal and the elliptic ratio signal for performing A/D conversion,
   a pulse motor driving circuit, operatively connected to said polarization operating apparatus, for driving said polarization operating apparatus, and
   a numerical value operating circuit, operatively connected to aid pulse motor driving circuit and responsive to said A/D converter, for controlling said pule motor driving circuit to minimize the outputs of said A/D converter.

12. The heterodyne receiving apparatus according to claim 11, wherein said numerical value operating circuit processes numerical data in accordance with a mountain-climbing algorithm.

13. The heterodyne receiving apparatus according to claim 9, further comprising:
   a first power monitor operatively connected to said 90-degree hybrid coupler and said polarization control circuit responsive to the first sum from said 90-degree hybrid coupler, and
   a second power monitor operatively connected to said optical receivers and said differential amplifier responsive to the intermediate frequency signals from the optical receivers.

14. A heterodyne receiving apparatus for use in coherent optical communication comprising:
   an optical local oscillating circuit for oscillating a local oscillation light,
   polarization operating apparatus for varying a polarization state of a signal light transmitted through an optical transmission path, a mixing circuit responsive to said optical local oscillating circuit and said polarization operating apparatus for mixing the signal light with the local oscillation light to produce a mixed light and for dividing the mixed light into first and second light signals having a 180-degree phase difference, a first polarization splitter responsive to said mixing circuit for dividing the first light signal from the mixing circuit into first and second orthogonal polarization components, first and second optical receivers responsive to said first polarization splitter for performing heterodyne detection of signals representing the first and second orthogonal polarization components obtained from the first polarization splitter and for respectively outputting first and second intermediate frequency signals, a second polarization splitter responsive to said mixing circuit for dividing the first light signal from the mixing circuit into third and fourth orthogonal polarization components, third and fourth optical receivers responsive to said second polarization splitter for performing heterodyne detection of signals representing the third and fourth orthogonal polarization components obtained from the second polarization splitter and for respectively outputting third and fourth intermediate frequency signals, a first subtractor responsive to said first and third light receivers for subtracting the first intermediate frequency signal output of the first optical receiver from the third intermediate frequency signal output of the third optical receiver to produce a fifth intermediate frequency signal, a second subtractor responsive to said second and fourth light receivers for subtracting the second intermediate frequency signal output of the second light receiver from the fourth intermediate frequency signal output of the fourth light receiver to produce a sixth intermediate frequency signal, a 90-degree hybrid coupler responsive to said first and second subtractors for delaying the phase of the fifth and sixth intermediate frequency signals by 90 degrees to produce, respectively first and second delayed signals, for adding the first delayed signal to the sixth intermediate frequency signal to produce a second sum and for adding the second delayed signal to the fifth intermediate frequency signal to produce a first sum;

a demodulator responsive to said 90-degree hybrid coupler for demodulating the second sum outputted from said 90-degree hybrid coupler, and a polarization control circuit for driving the polarization operating apparatus based on the fifth and sixth intermediate frequency signals output from said first and second subtractors and the first sum output from said 90-degree hybrid coupler to control the polarization status of the signal light, thereby constituting a dual balanced optical receiver.

15. The heterodyne receiving apparatus according to claim 14, wherein both the signal light and the local oscillation light have polarization states with principal axes slanted at 45 degrees and a phase difference of 90 degrees.

16. The heterodyne receiving apparatus according to claim 14, wherein said optical local oscillating circuit includes a semiconductor laser.

17. The heterodyne receiving apparatus according to claim 14, wherein said polarization operating apparatus comprises:

a λ/4 plate and a λ/2 plate arranged in series along the path of the signal light, and a pulse motor for independently rotating the λ/4 and λ/2 plates.

18. The heterodyne receiving apparatus according to claim 14, wherein said first to fourth optical receivers comprise photo-diodes and the first to fourth orthogonal components obtained by said first and second polarization splitters are subjected to heterodyne detection, thereby providing intermediate frequency signal whose phases are shifted 90 degrees from each other.

19. The heterodyne receiving apparatus according to claim 18, wherein said 90-degree hybrid coupler transmits the second sum to said demodulator, and provides the first sum as an elliptic ratio signal.

20. The heterodyne receiving apparatus according to claim 19, wherein the elliptic ratio signal outputted from said 90-degree hybrid coupler is minimized, thereby deleting the image component from the second sum outputted from said 90-degree hybrid coupler.

21. The heterodyne receiving apparatus according to claim 18, wherein said receiver further comprises a differential amplifier, the fifth and sixth intermediate frequency signals from the first and second subtractors are inputted to said differential amplifier and said differential amplifier outputs a principal axis angle signal for monitoring the principal axis angle of the signal light, wherein the first sum output from the first output port of the said 90-degree hybrid coupler is an elliptic ratio signal for monitoring an elliptic ratio of the signal light, the principle axis angle signal for monitoring the principal axis angle and the elliptic ratio signal for monitoring the elliptic ratio being inputted to said polarization control circuit.

22. The heterodyne receiving apparatus according to claim 21, wherein said polarization control circuit drives said polarization operating apparatus to minimize both the principal axis angle signal for monitoring the principal axis angle and the elliptic ratio signal for monitoring the elliptic ratio.

23. The heterodyne receiving apparatus according to claim 22, wherein said polarization control circuit comprises:

an A/D converter, operatively connected to receive the principal axis angle signal and the elliptic ratio signal; for performing A/D conversion of the principal angle signal and the elliptic ratio signal and providing digital outputs, a pulse motor driving circuit, operatively connected to said polarization operating apparatus, for driving the polarization operating apparatus, and a numerical processing circuit, operatively connected to said pulse motor driving circuit and responsive to said A/D converter, for controlling the pulse motor driving circuit so that the digital outputs of said A/D converter are minimized.

24. The heterodyne receiving apparatus according to claim 23, wherein said numerical processing circuit performs numerical processing using a mountain-climbing method.

25. The heterodyne receiving apparatus according to claim 21, wherein the elliptic ratio signal output from said 90-degree hybrid coupler and the principal axis angle signal output from said differential amplifier are respectively applied to said polarization control circuit.

26. A heterodyne receiver for use in optical communication, comprising:
- an optical local oscillating circuit for oscillating a local oscillator and outputting a local oscillation light,
- a polarization operating apparatus for varying the polarization state of a signal light transmitted through an optical light transmission line,
- a mixing circuit responsive to said optical local oscillating circuit and said polarization operating apparatus for mixing the signal light with the local oscillation light output from said optical local oscillation circuit to produce a mixed light,
- a polarization splitter responsive to said mixing circuit for separating the mixed light output from said mixing circuit into two kinds of polarization components,
- an optical receiver responsive to said polarization splitter for performing heterodyne detection on the two kinds of polarization components, to produce intermediate frequency signals,
- a demodulator for demodulating an intermediate frequency signal output from said optical receiver,
- a differential amplifier responsive to said optical receiver for subtracting two intermediate frequency signals output from said optical receiver and outputting a principle axis angle signal to said polarization control circuit for monitoring the principle axis angle of the signal light,
- a polarization control circuit for controlling said polarization state of the signal light by driving said polarization operating apparatus based on the principle axis angle signal output from said differential amplifier and a monitoring signal, derived from the intermediate frequency signals outputted from the optical receiver, the monitoring signal monitoring a polarization state of said signal light, and
- a 90-degree hybrid coupler including a first input port and a second input port responsive to said optical receiver, said 90-degree hybrid coupler for delaying by 90 degrees the phase of an intermediate frequency signal input to the first input port to produce a first delayed signal and for adding the first delayed signal to another intermediate frequency signal received by the second input port to produce a second sum, said 90-degree hybrid coupler for delaying by 90 degrees the phase of the intermediate frequency signal received by the second input port to produce a second delayed signal and for adding the second delayed signal to the intermediate frequency signal received by the first input port to produce a first sum.

27. The heterodyne receiver according to claim 26, wherein said 90-degree hybrid coupler outputs the first sum as an elliptic ratio signal for the signal for monitoring a polarization state of the signal light.

28. The heterodyne receiver according to claim 27, wherein said 90-degree hybrid coupler outputs the elliptic ratio signal with a minimum value and removes an image component from the second sum.

29. The heterodyne receiver according to claim 26, wherein the first sum output of said 90-degree hybrid coupler is provided to said polarization control circuit as an elliptic ratio signal for the signal for monitoring a polarization state of the signal light.

30. The heterodyne receive according to claim 29, wherein said polarization control circuit drives said the polarization operating apparatus to minimize both the principal axis angle signal and the elliptic ratio signal.

31. The heterodyne receiver according to claim 30, wherein said polarization control circuit comprises:
- an A/D converter responsive to the principal axis angle signal and the elliptic ratio signal for performing A/D conversion and providing digital outputs,
- a numerical value operating circuit operatively connected to said A/D converter for controlling said pulse motor driving circuit to minimize the digital outputs of said A/D converter, and
- a pulse motor driving circuit operatively connected to said numeric value operating circuit for driving said polarization operating apparatus.

32. The heterodyne receiver according to claim 31, wherein said numerical value operating circuit processes numerical data in accordance with a mountain-climbing algorithm.

33. The heterodyne receiver according to claim 29, further comprising:
- a first power monitor operatively connected to said 90-degree hybrid coupler and said polarization control circuit responsive to the first sum of said 90-degree hybrid coupler, and
- a second power monitor operatively connected to said optical receiver and said differential amplifier responsive to the intermediate frequency signals.

* * * * *

UNITED STATES PATENT AND TRADEMARK OFFICE
CERTIFICATE OF CORRECTION

PATENT NO. : 5,052,051

DATED : September 24, 1991

INVENTOR(S) : Naito et al.

It is certified that error appears in the above-identified patent and that said Letters Patent is hereby corrected as shown below:

Col. 2, line 18, "application" should be --Application--.

Col. 3, lines 7 and 8 should be a continuous paragraph.

Col. 10, line 44, "aid" should be --said--.

Signed and Sealed this

Twelfth Day of January, 1993

Attest:

DOUGLAS B. COMER

*Attesting Officer*  *Acting Commissioner of Patents and Trademarks*